(12) United States Patent
Quitter et al.

(10) Patent No.: US 10,678,206 B2
(45) Date of Patent: Jun. 9, 2020

(54) REMOTE FEATURE MEASUREMENT (71) Applicant: UNITED TECHNOLOGIES CORPORATION, Hartford, CT (US)

(72) Inventors: John Quitter, Farmington, CT (US); Joseph D. Drescher, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1091 days.

(21) Appl. No.: 14/759,497

(22) PCT Filed: Nov. 8, 2013

(86) PCT No.: PCT/US2013/069210
§ 371 (c)(1),
(2) Date: Jul. 7, 2015

(87) PCT Pub. No.: WO2014/116334
PCT Pub. Date: Jul. 31, 2014

(65) Prior Publication Data
US 2015/0343566 A1 Dec. 3, 2015

Related U.S. Application Data (60) Provisional application No. 61/749,998, filed on Jan. 8, 2013.

(51) Int. Cl.
*G05B 19/18* (2006.01)
*B23K 26/03* (2006.01)
(Continued)

(52) U.S. Cl.
CPC .......... *G05B 19/182* (2013.01); *B23K 26/032* (2013.01); *B23K 26/382* (2015.10);
(Continued)

(58) Field of Classification Search
CPC ... G05B 19/182; B23K 26/382; B23K 26/032
(Continued)

(56) References Cited

U.S. PATENT DOCUMENTS 6,205,763 B1 * 3/2001 Farmer .................. F23C 7/002
29/888
6,380,512 B1 * 4/2002 Emer ..................... B23K 26/04
219/121.71
(Continued)

FOREIGN PATENT DOCUMENTS

EP 1520652 4/2005
EP 1520652 A1 * 4/2005 ............. B23K 26/04
(Continued)

*Primary Examiner* — Mohammad Ali
*Assistant Examiner* — Sheela Rao
(74) *Attorney, Agent, or Firm* — Bachman & LaPointe, P.C.

(57) ABSTRACT

A system includes a laser-line imaging subsystem to measure a feature. The laser-line imaging subsystem includes a laser to project a laser-line, and a digital video camera mounted at an angle with respect to an axis of said laser to obtain an optical image of the laser-line. A control subsystem is operable to compute three-dimensional coordinate points via triangulation of an intersection between the laser-line and the optical image of the laser-line, the three-dimensional coordinate points data used by the control subsystem to calculate predictive airflow through the workpiece with respect to the volume of the machined holes.

15 Claims, 11 Drawing Sheets

(51) Int. Cl.
*B23K 26/382* (2014.01)
*B23K 101/00* (2006.01)

(52) U.S. Cl.
CPC ...... *B23K 26/389* (2015.10); *B23K 2101/001* (2018.08); *B23P 2700/06* (2013.01); *G05B 2219/37281* (2013.01); *G05B 2219/45139* (2013.01)

(58) Field of Classification Search
USPC .......................................................... 700/166
See application file for complete search history.

(56) References Cited

U.S. PATENT DOCUMENTS

| | | | |
|---|---|---|---|
| 2002/0143435 A1* | 10/2002 | Terada | B23K 26/0884 700/245 |
| 2006/0229759 A1* | 10/2006 | Luketic | B23K 26/03 700/166 |
| 2009/0220349 A1 | 9/2009 | Bolms et al. | |
| 2012/0318775 A1 | 12/2012 | Schwarz et al. | |
| 2018/0172428 A1* | 6/2018 | Bridges | H04N 5/2251 |

FOREIGN PATENT DOCUMENTS

| | | |
|---|---|---|
| JP | H11254173 | 9/1999 |
| WO | WO03031107 | 4/2003 |

* cited by examiner

REMOTE FEATURE MEASUREMENT

Applicant hereby claims priority to U.S. Patent Application No. 61/749,998 filed Jan. 8, 2013, the disclosure of which is herein incorporated by reference.

STATEMENT REGARDING FEDERALLY SPONSORED RESEARCH OR DEVELOPMENT

This disclosure was made with Government support under FA8650-11-C-5111 awarded by The United States Air Force. The Government has certain rights in this invention.

BACKGROUND

The present disclosure relates to system to drill any measure features.

Gas turbine engines, such as those which power modern military and commercial aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section military aircraft engines often include an augmentor section, or "afterburner" operable to selectively increase thrust. The increase in thrust is produced when fuel is injected into the core exhaust gases downstream of the turbine section and burned with the oxygen contained therein to generate a second combustion.

The augmentor section and the downstream exhaust duct and nozzle sections may be exposed to high temperature exhaust gases. The exhaust gas temperatures may in some instances exceed the metallic alloy capabilities in these sections such that film cooling is provided therefor. The cooling air is provided though numerous cooling holes to sheath the hardware from the exhaust gases. The cooling holes are typically machined via a laser drill.

SUMMARY

A system according to one disclosed non-limiting embodiment of the present disclosure includes a machining subsystem to machine features, and a laser-line imaging subsystem to measure said feature.

In a further embodiment of the foregoing embodiment, the machining subsystem includes a robotic extension arm.

In a further embodiment of any of the foregoing embodiments, the machining subsystem includes a laser drill.

In a further embodiment of any of the foregoing embodiments, the laser-line imaging subsystem includes a laser with a cylindrical lens to project a laser-line. In the alternative or additionally thereto, in the foregoing embodiment the laser-line imaging subsystem includes a digital video camera mounted at an angle with respect to an axis of said laser. In the alternative or additionally thereto, the foregoing embodiment includes a control subsystem operable to compute three-dimensional coordinate points via triangulation of an intersection between said laser-line and an optical image of said laser-line. In the alternative or additionally thereto, in the foregoing embodiment the three-dimensional coordinate points are determined from each video frame. In the alternative or additionally thereto, in the foregoing embodiment more than tens of thousands of points per second are determined.

In a further embodiment of any of the foregoing embodiments, the system includes a robotic extension arm that mounts a laser-line imager of said laser-line imaging subsystem and a robotic extension arm that mounts a laser drill of said machining subsystem, said robotic extension arm that mounts said laser-line imager and said robotic extension arm that mounts said laser drill are generally opposite with a workpiece mounted therebetween. In the alternative or additionally thereto, in the foregoing embodiment the workpiece mount is rotatable.

In a further embodiment of any of the foregoing embodiments, the features are laser drilled holes drilled through gas turbine engine component from a thermal barrier coated surface side.

A method of machining features according to another disclosed non-limiting embodiment of the present disclosure includes measuring a first of an at least partially laser drilled feature of a multiple of laser drilled features while at least partially laser drilling a second of the multiple of laser drilled features.

In a further embodiment of the foregoing embodiment, the method includes laser drilling the second of the multiple of laser drilled feature.

In a further embodiment of any of the foregoing embodiments, the method includes measuring the first of the at least partially laser drilled feature of the multiple of laser drilled feature with a laser.

In a further embodiment of any of the foregoing embodiments, the method includes measuring the first of the at least partially laser drilled feature of the multiple of laser drilled features with a laser-line imaging subsystem In a further embodiment of any of the foregoing embodiments, the method includes computing three-dimensional coordinate points via triangulation of an intersection between a laser-line projected onto a workpiece and an optical image of the laser-line. In the alternative or additionally thereto, the foregoing embodiment includes determining the three dimensional coordinate points from each video frame of the optical image. In the alternative or additionally thereto, the foregoing embodiment includes determining hundreds of points per video frame. In the alternative or additionally thereto, the foregoing embodiment includes determining over tens of thousands of points per second.

In a further embodiment of any of the foregoing embodiments, the method includes laser drilling the second of the multiple of laser drilled features through a thermally coated component of a gas turbine engine.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
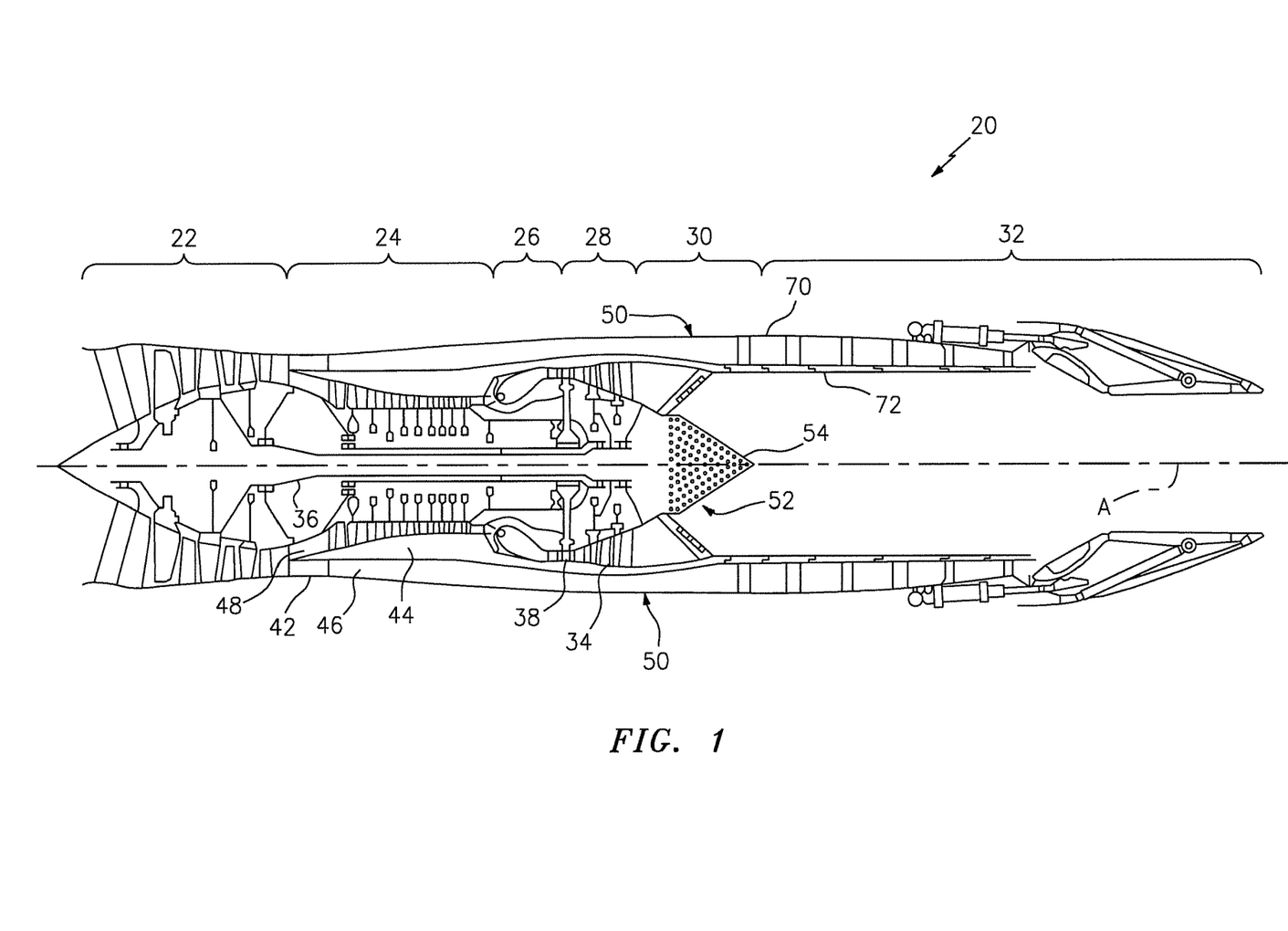
FIG. 1 is a general schematic view of an exemplary gas turbine engine embodiment for use with the present disclosure.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle section 34 along a central longitudinal engine axis A. Although depicted as an augmented low bypass turbofan in the disclosed non-limiting embodiment, it should be understood that the concepts described herein are applicable to other gas turbine engines including geared architecture engines, direct drive turbofans, turbojet, turboshaft, three-stream variable cycle and other engine architectures.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Air that enters the fan section 22 is divided between a primary airflow through the primary airflow path 42 and a secondary airflow through the secondary airflow path 40. The primary airflow passes through the combustor section 26, the turbine section 28, then the augmentor section 30 where fuel may be selectively injected and burned to generate additional thrust through the nozzle section 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein is any airflow different from the primary airflow. The secondary airflow may ultimately be at least partially injected into the primary airflow path 42 adjacent to the exhaust duct section 32 and the nozzle section 34.

The augmenter section 30 generally includes a turbine exhaust case (TEC) 50 and a center body 52 with a tail cone 54. The TEC 50 generally includes an outer case 70 of the outer engine case structure 42 and a concentrically spaced inner liner 72 that operates as a heat shield to protect the outer case 70 from the exhaust gas flow in the flow path. Air discharged from, for example, the fan section 22 is communicated through the secondary airflow path 46 for communications through numerous cooling holes in the tail cone 54 and liner 72.

Figure 2:
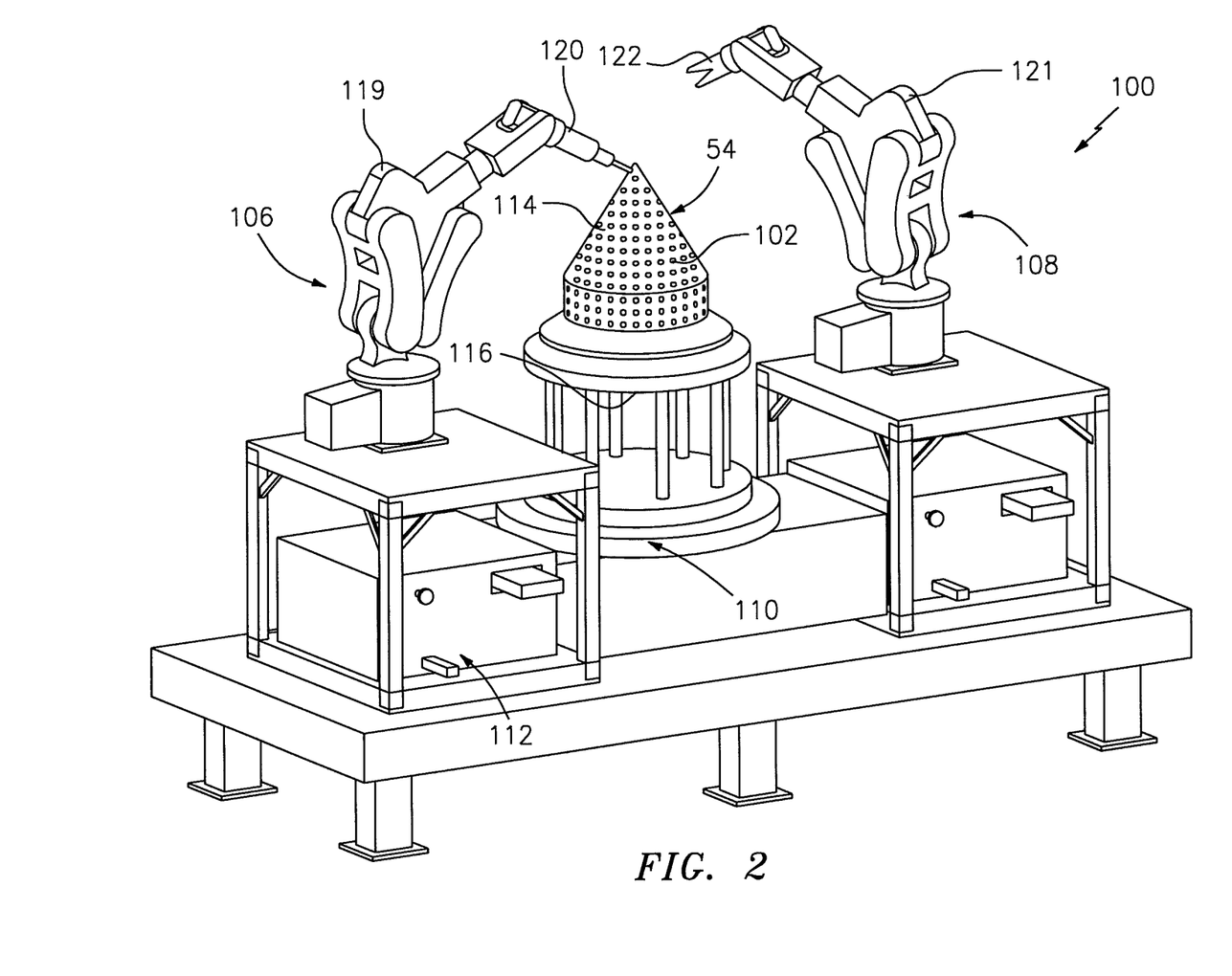
FIG. 2 is a schematic view of a system to machine and measure features in a workpiece according to one disclosed non-limiting embodiment.

With reference to FIG. 2, a system 100 to machine and measure machined features 102 in a workpiece 104 generally includes a machining subsystem 106, a laser-line imaging subsystem 108 a workpiece mount subsystem 110 and a control subsystem 112. Although laser-drilled cooling through-holes are illustrated in the disclosed non-limiting embodiment, various machined features 102 such as shaped holes, trenches, through-holes, pattern apertures and others that are laser drilled or otherwise machined will also benefit herefrom and are encompassed by the term "machined feature" as utilized herein. The machined features 102 illustrated in the disclosed non-limiting embodiment are through-holes that are each about 0.024" (0.6 mm) in diameter.

Although the workpiece is illustrated in the disclosed non-limiting embodiment as the tail cone 54, it should be understood that any component that may require laser-drilled cooling holes or other machined features will also benefit herefrom such as, for example, combustors, augmentor sections, exhaust duct liners, nozzle sections, convergent divergent flaps and seals, turbine airfoils, static structure and other metallic alloy and non-metallic components. The workpiece is often manufactured from super nickel alloys, including a ceramic coating on the hot side surface. The tail cone 54 generally includes a thermal barrier coated surface 114 exposed to the exhaust gasses and a bare alloy or uncoated surface 116 opposite thereto. The machined features 102 are typically drilled from the hot or thermal barrier coated surface 114 side of the component.

Figure 3:
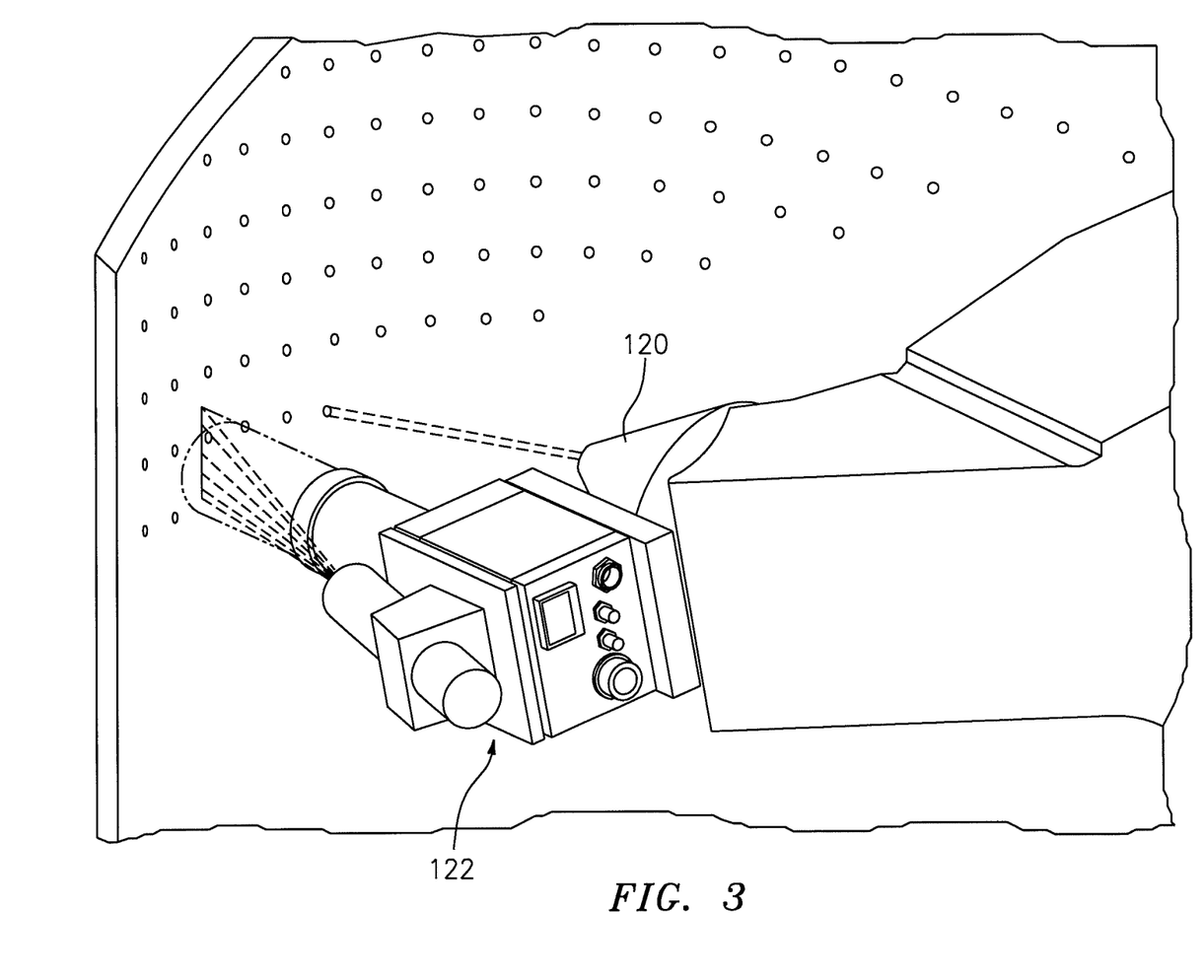
FIG. 3 is a schematic view of a system to machine and measure features in a workpiece according to another disclosed non-limiting embodiment.

The laser machining subsystem 106 generally includes a robotic extension arm 119 that supports and positions a laser drill 120. The laser-line imaging system 108 generally includes a robotic extension arm 121 that supports and positions a laser-line imager 122. The laser machining subsystem 106 and the laser-line imaging system 108 may be generally opposed and move with respect to the workpiece mount subsystem 110 in response to the control subsystem 112. Alternatively, the laser machining subsystem 106 and the laser-line imaging system 108 may be mounted to a single robotic extension arm (FIG. 3).

Figure 4:
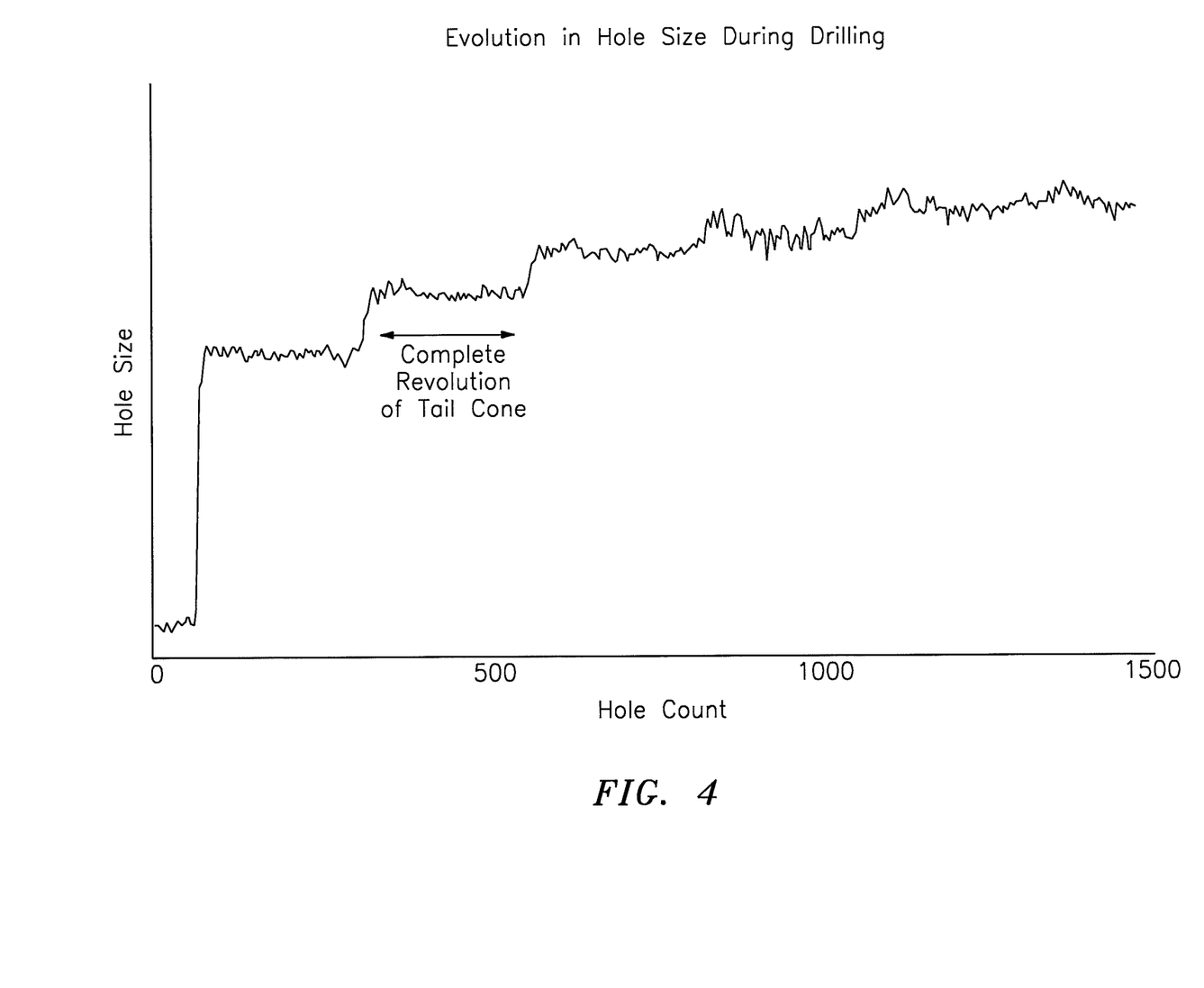
FIG. 4 is a graphical representation of a size progression of laser drilled cooling holes in a workpiece mounted to a rotatable workpiece mount subsystem.

The laser drill 120 operates to drill the machined features 102 through the workpiece. Typically, the laser drill 120 drills only partially through the workpiece for each laser shot. That is, the laser drill 120 creates a dimple that is progressively deepened until the laser drill 120 passes through the workpiece to create a through-hole (FIG. 4). In one disclosed non-limiting embodiment, the laser drill 120 drills partially through the workpiece and the workpiece is rotated by the workpiece mount subsystem 110 such that approximately twelve (12) laser shots—twelve rotations—are required for each machined features 102 to be formed.

Figure 5:
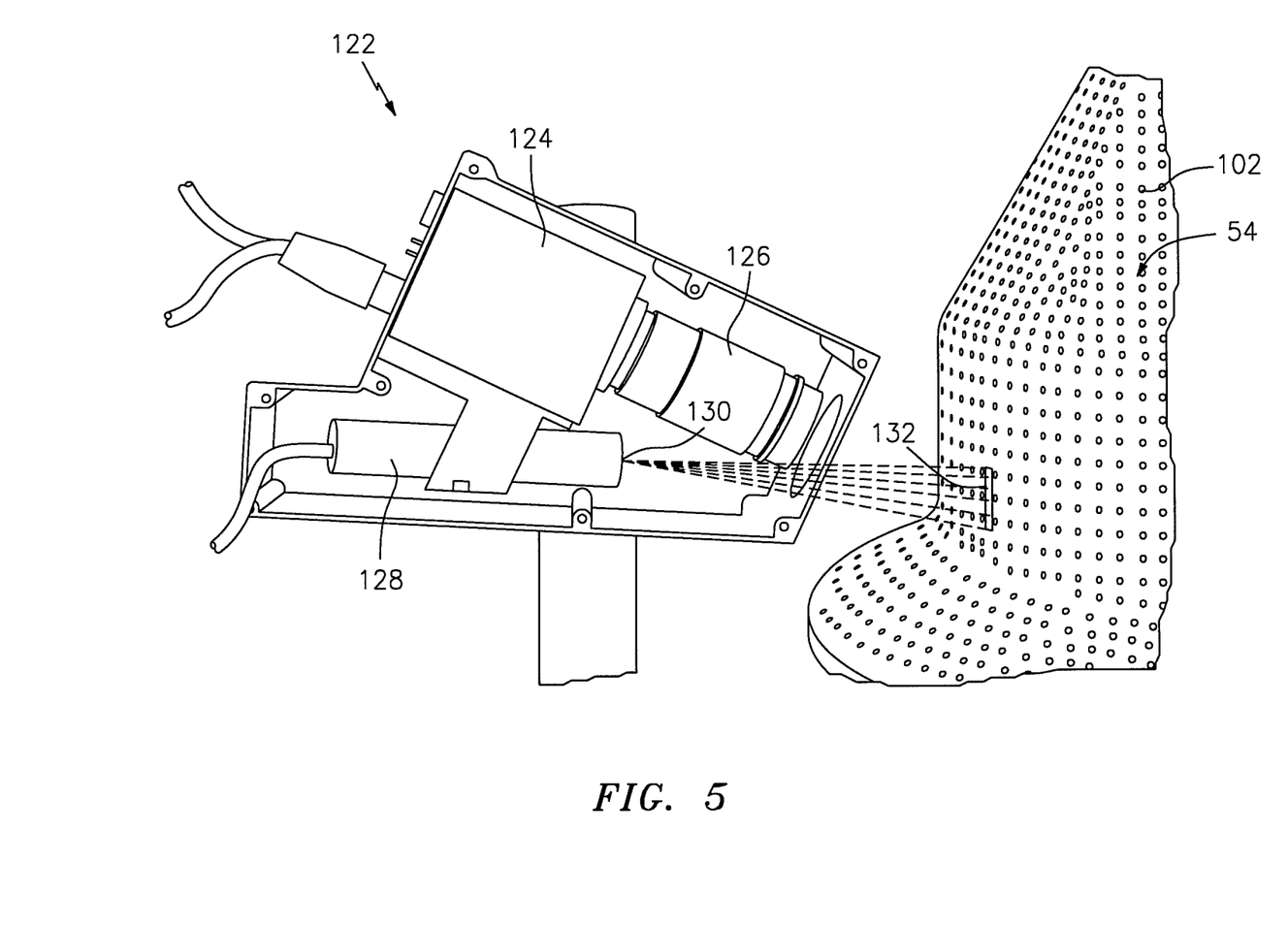
FIG. 5 is a schematic view of a laser-line imager.

With reference to FIG. 5, the laser-line imager 122 generally includes a high-speed digital camera 124 with a macro lens 126 and a low power laser 128 with a cylindrical lens 130 to project a laser-line 132. The high-speed digital camera 124 is mounted at an angle with respect to the low power laser 128 to facilitate computation of the three-dimensional coordinate points of the laser-line 132 via triangulation. The control subsystem 112 may be utilized for data acquisition, system control and data processing.

The functions of the design methodology are disclosed in terms of functional block diagrams, and it should be understood by those skilled in the art with the benefit of this disclosure that these functions may be enacted in either dedicated hardware circuitry or computer readable medium containing programming instructions capable of execution in a microprocessor based computing device. For example, when the control subsystem 112 is in operation, a processor can be configured to execute software stored within a memory, to communicate data to and from the memory, and to generally control operations pursuant to the software. Software in memory, in whole or in part, is read by the processor, perhaps buffered within the processor, and then executed through an input-output interface.

Figure 6:
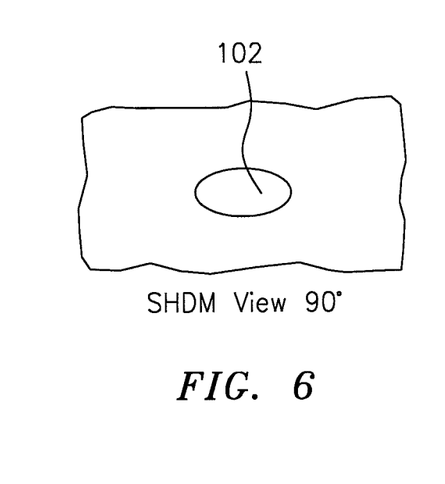
FIG. 6 is a 90 degree view of a laser drilled cooling hole at 30 degrees to the surface.
Figure 7:
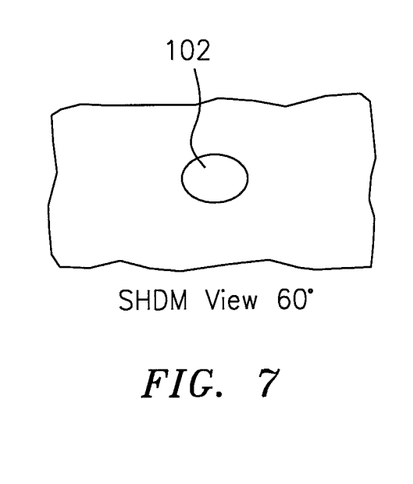
FIG. 7 is a 60 degree view of a laser drilled cooling hole at 30 degrees to the surface.
Figure 8:
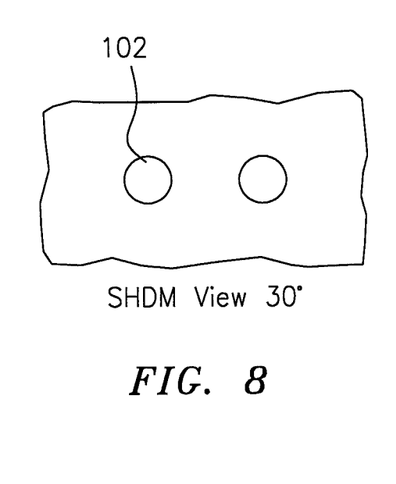
FIG. 8 is a 30 degree view of a laser drilled cooling hole at 30 degrees to the surface.

The laser-line imager 122 is operated in response to the control subsystem 112 to view the laser-line 132 as reflected from the machined features 102 at one or more angles with respect thereto. For example, a machined features 102 that is drilled thirty (30) degrees with respect to the workpiece surface will be viewed differently at a 90 degree angle (FIG. 6), a 60 degree angle (FIG. 7) and a gun barrel (30) degree angle (FIG. 8).

Figure 9:
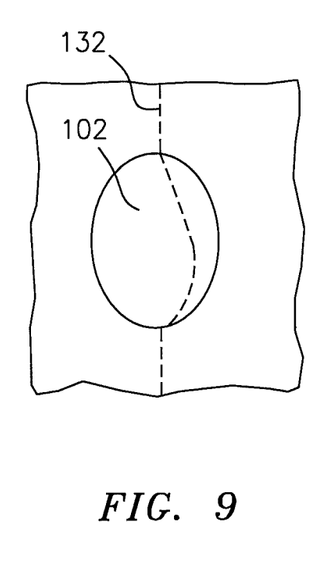
FIG. 9 is a 30 degree view of a laser drilled cooling hole at 30 degrees to the surface with a laser line thereon.

The low power laser 128 projects the laser-line 132 on the workpiece and the laser-line 132 position is imaged with the high-speed digital camera 124 (FIG. 9). The three-dimensional coordinates of the points illuminated by the laser are computed based on triangulating the point of intersection between the plane of the laser-line 132 illumination and the optical image associated with the camera pixel that captures that portion of the laser-line 132. The three-dimensional coordinate points illuminated by the laser-line 132 are then determined from each video frame from the high-speed digital camera 124—which may be hundreds of points per frame. The high-speed video camera 124 such as a hundreds of point per second camera, enables coordinate measurements of greater than tens of thousands of point per second.

Figure 10:
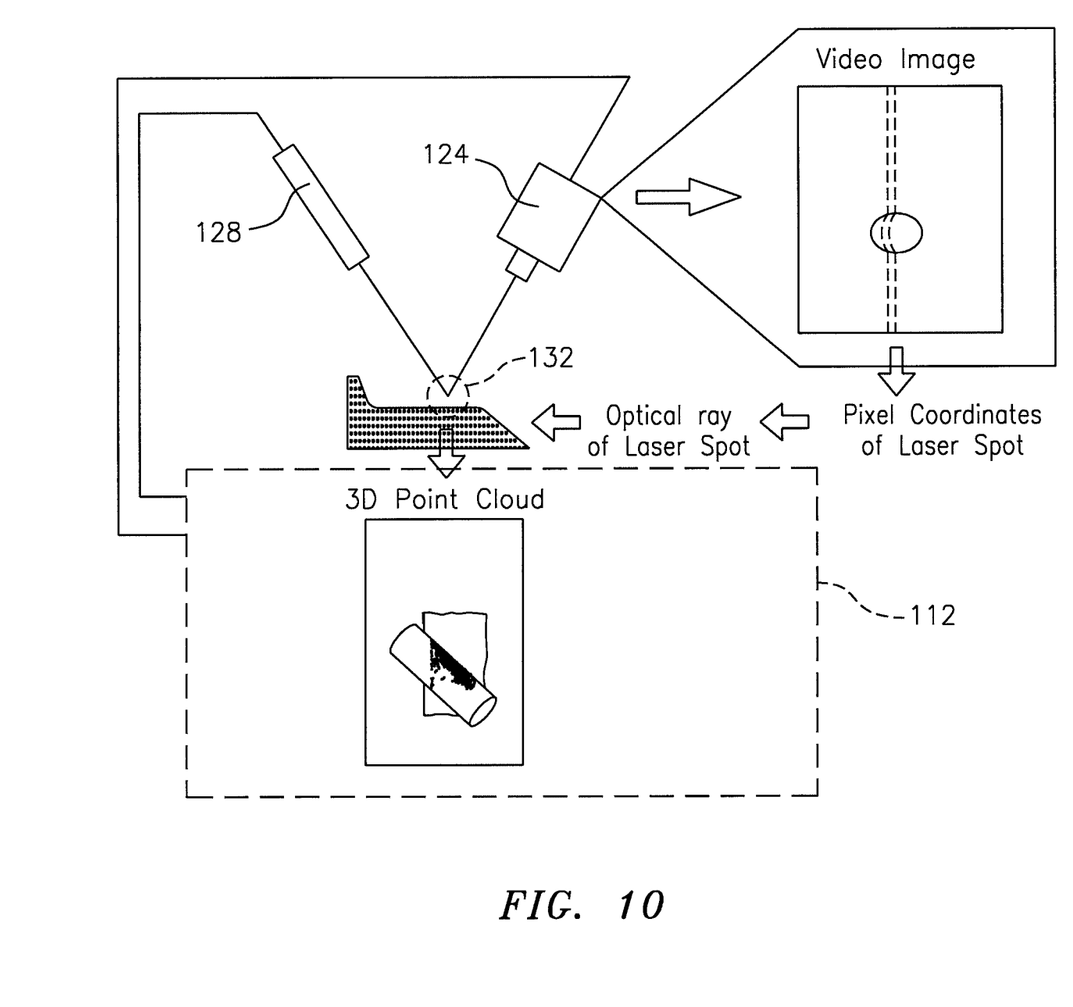
FIG. 10 is a schematic block diagram view of a laser-line imaging system.
Figure 11:
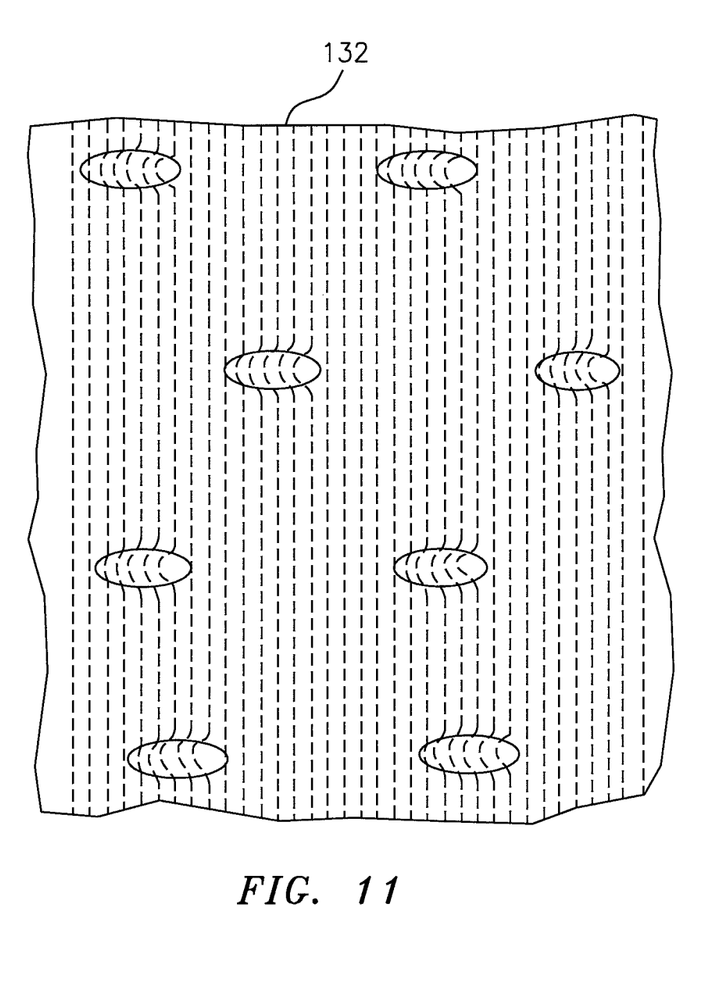
FIG. 11 is a schematic view of a multiple of laser lines on a workpiece.

With reference to FIG. 10, the three-dimensional coordinate points are captured in a point-cloud and the information is stored in a data buffer file of the control subsystem 112. The low power laser 128 may project the single laser-line 132 to obtain the three-dimensional coordinate points in accords with one-disclosed non-limiting embodiment. Alternatively, the low power laser 128 may project multiple laser-lines 132 (FIG. 11) for greater measurement capability.

Figure 12:
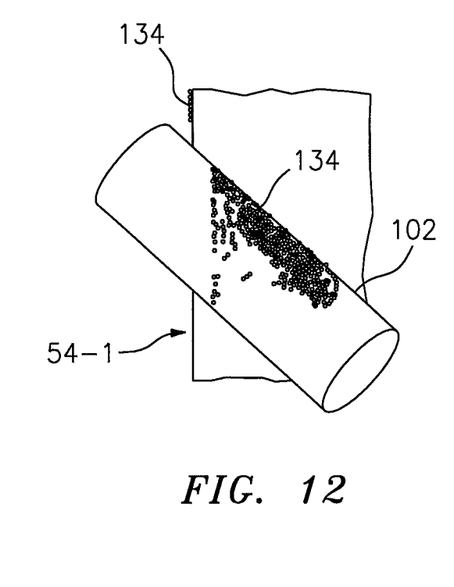
FIG. 12 is a schematic sectional view of a cooling hole illustrating a point cloud of three-dimensional coordinate points both on and within the cooling hole.

With reference to FIG. 12, the three-dimensional coordinate points 134 (illustrated schematically) on A surface 54-1 of the workpiece around the machined features 102 facilitates determination of hole size and shape. That is, the laser-line imaging system 108 readily derives the diameter of the machined features 102 directly via the gun-barrel view (FIG. 7) and/or at an off-axis angular orientations (FIG. 5, 6) where the elliptical shape is mathematically projected to estimate the through-hole diameter. It should be understood that various mathematical Algorithms may be utilized to convert the point cloud to a diameter—or other geometry. With the diameter determined the volume thereof is also readily determined.

Figure 13:
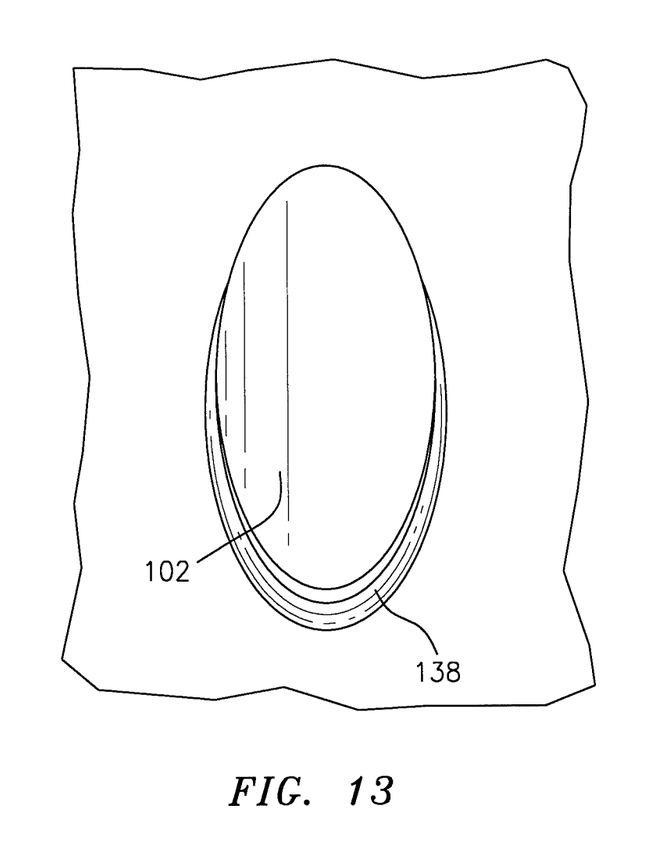
FIG. 13 is a perspective view of a laser drilled cooling hole illustrating a raised periphery.
Figure 14:
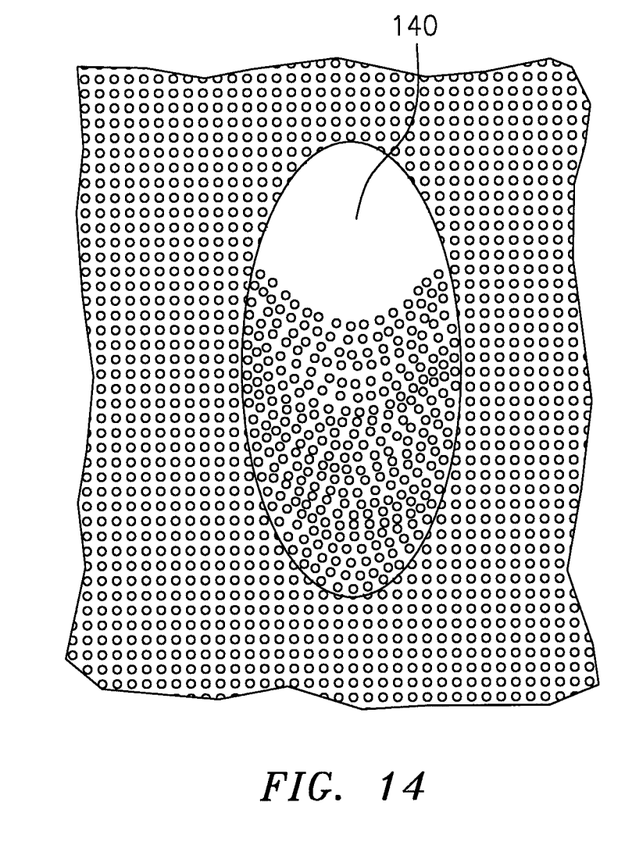
FIG. 14 is a schematic view of a laser drilled cooling hole illustrating the point cloud of three-dimensional coordinate points.

With continued reference to FIG. 12, the three-dimensional coordinate points 136 (illustrated schematically) within a shaft of the machined features 102 may be readily utilized to determine the angle of the machined features 102. The laser-line imaging system 108 readily records the three-dimensional coordinate points 134 on the interior of the hole regardless of the ambient lighting or the surface finish. Also, raised material 138 (FIG. 13) deposited around the hole perimeter due to laser drilling is readily captured as the three-dimensional coordinate points 134 capture both positive and negative surface features. The absence of three-dimensional coordinate points 134 (FIG. 14; area 140) is representative of the through hole where there is no material for the laser-line 132 to scan. Significantly detailed three-dimensional mapping is thereby provided.

Figure 15:
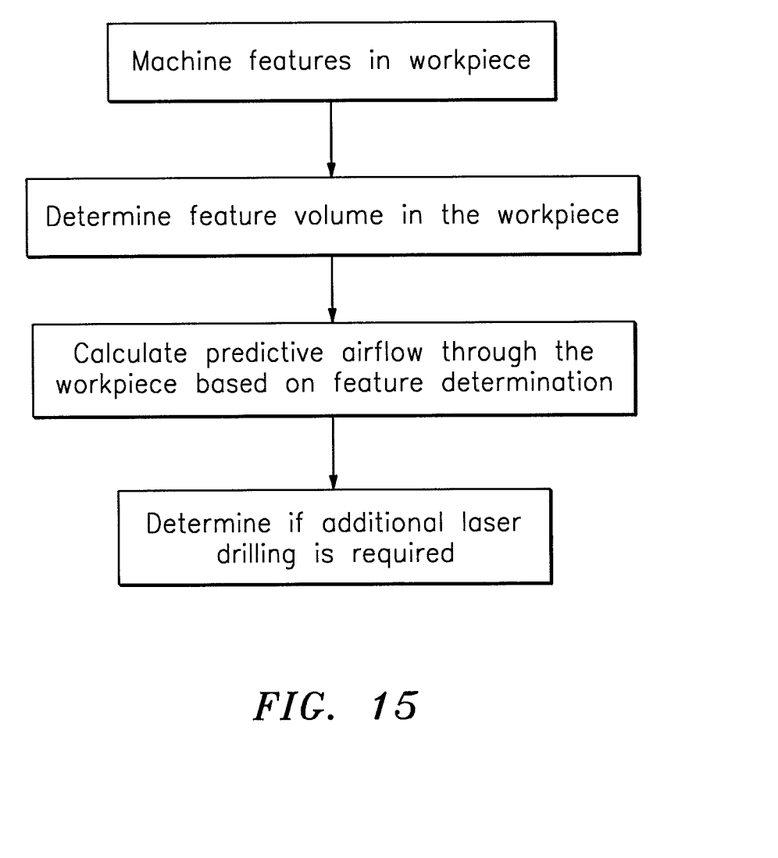
FIG. 15 is a block diagram illustrating operation of the system.

With reference to FIG. 15, the three-dimensional coordinate points 134 data may be used to calculate predictive airflow through the workpiece with respect to the volume of the machined features 102. The calculated predictive airflow thereby permits the determination of whether additional laser drilling is required. This determination eliminates the conventional practice of workpiece removal for remote airflow measurement. Current practice often involves removal of the workpiece several times during the drilling operation, or the manipulation of an awkward on-machine airflow apparatus. Current practice may also provide a sample population too small to be effective to high confidence as current processes do not effectively track hole diameter trends from hole to hole or row to row.

The system 100 facilitates the drilling of cooling air holes and measurement thereof in a single process. The system 100 measures hole diameters with greater accuracy than conventional pin gauges and airflow checks as well as provide the capability to measure/record each and every hole diameter, so that this data can then be correlated to airflow.

The system 100 advantageously provides superior measurement capability, and is statistically more reliable/reproducible which readily eliminates the rework cycle as well because the hardware can be measured as drilled, and the machine operator can be notified immediately of hole diameter/airflow trends. The cycle time reduction provided by the system 100 is significant, especially for relatively large exhaust duct section components e.g., 5 hours in but one example.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A system comprising:
    a workpiece mount for a thermally coated component of a gas turbine engine;
    a machining subsystem to machine a multiple of laser drilled holes in the thermally coated component while the component is on the workpiece mount;

a laser-line imaging subsystem to measure each of the multiple of laser drilled holes manufactured by a machining subsystem, said laser-line imaging subsystem comprising a laser to project a laser-line, and a digital video camera mounted at an angle with respect to an axis of said laser to obtain an optical image of said laser-line;

a robotic extension arm that mounts the laser-line imager;

a robotic extension arm that mounts a laser drill of said machining subsystem, said robotic extension arm that mounts said laser-line imager and said robotic extension arm that mounts said laser drill are generally opposite with the workpiece mounted therebetween; and a control subsystem operable to compute three-dimensional coordinate points via triangulation of an intersection between said laser-line and the optical image of said laser-line, wherein more than tens of thousands of points per second are determined from each video frame to determine whether additional laser drilling of one or more of the multiple of laser drilled holes are required in response to the volume of the machined holes while the component is on the workpiece mount.

2. The system as recited in claim 1, wherein said workpiece mount is rotatable.

3. The system as recited in claim 1, wherein said holes are laser drilled holes drilled through a gas turbine engine component from a thermal barrier coated surface side.

4. A method of machining holes, comprising:

laser drilling a multiple of laser drilled holes through a thermally coated component of a gas turbine engine on a workpiece mount;

measuring one or more of the multiple of laser drilled holes in the thermally coated component on the workpiece mount with a laser-line imaging subsystem with a laser to project a laser-line;

obtaining an optical image of said laser-line with a digital video camera mounted at an angle with respect to an axis of said laser while the component is on the workpiece mount;

computing three-dimensional coordinate points from each video frame of the optical image via triangulation of an intersection between said laser-line and the optical image of said laser-line while the component is on the workpiece mount; and calculating a predictive airflow through the workpiece with respect to a volume of the multiple of laser drilled holes, a diameter of each of the multiple of laser drilled holes derived via an off-axis angular orientation where an elliptical shape thereof is mathematically projected to estimate a through-hole diameter while the component is on the workpiece mount; and determining whether additional laser drilling of one or more of the multiple of laser drilled holes are required in response to the volume of the machined holes while the component is on the workpiece mount.

5. The system as recited in claim 1, wherein said three-dimensional coordinate points data is used by the control subsystem to calculate predictive airflow through the workpiece with respect to a volume of each of the multiple of laser drilled holes manufactured by said machining subsystem.

6. The system as recited in claim 4, wherein the three-dimensional coordinate points capture both positive and negative surface holes.

7. The method as recited in claim 4, further comprising:

measuring a first of a multiple of laser drilled holes while at least partially laser drilling a second of the multiple of laser drilled holes.

8. The method as recited in claim 4, further comprising:

determining hundreds of points per video frame.

9. The method as recited in claim 4, further comprising:

determining over tens of thousands of points per second.

10. The method as recited in claim 4, wherein the three-dimensional coordinates of the points illuminated by the laser are computed based on triangulating the point of intersection between the plane of the laser-line illumination and the optical image associated with the camera pixel that captures that portion of the laser-line.

11. The method as recited in claim 10, wherein the three-dimensional coordinate points illuminated by the laser-line are determined from each video frame from the digital video camera.

12. The method as recited in claim 4, wherein the diameter of the holes are derived via a gun-barrel view.

13. The method as recited in claim 4, further comprising recording the three-dimensional coordinate points on the interior of the hole regardless of an ambient lighting or a surface finish.

14. The method as recited in claim 4, further comprising capturing both positive and negative surface holes.

15. The method as recited in claim 4, further comprising rotating the workpiece mount.

* * * * *